(No Model.) 2 Sheets—Sheet 1.
E. WESTON.
STANDARD GALVANIC CELL.

No. 439,737. Patented Nov. 4, 1890.

WITNESSES: Gustave Dieterich. M. Bosch

INVENTOR Edward Weston BY Park Benjamin his ATTORNEY.

(No Model.) 2 Sheets—Sheet 2.
E. WESTON.
STANDARD GALVANIC CELL.
No. 439,737. Patented Nov. 4, 1890.
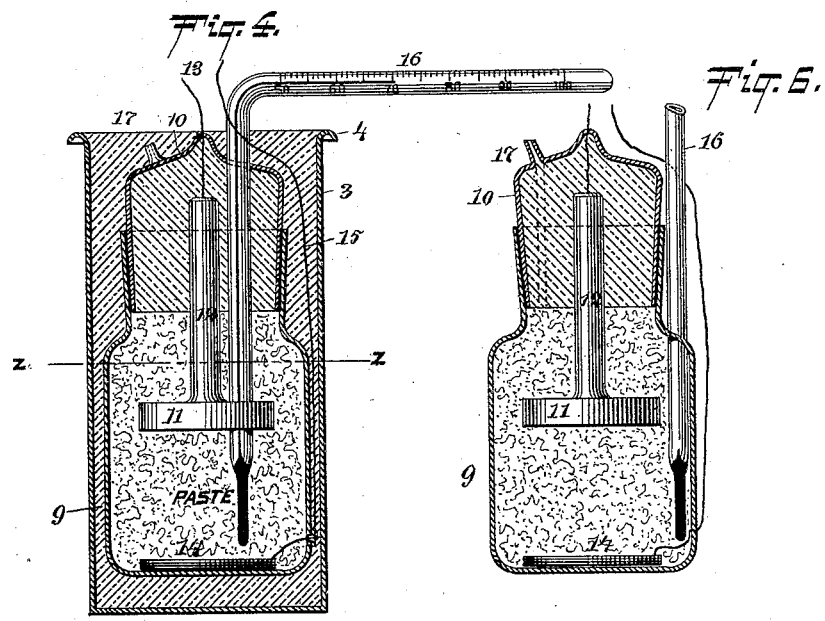
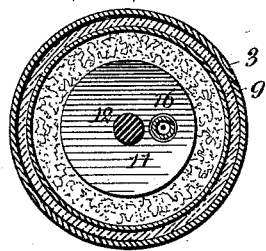
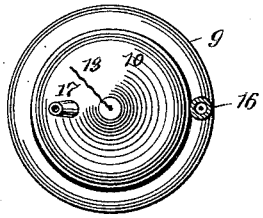
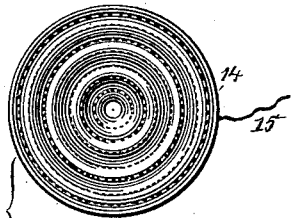
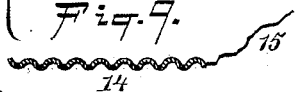
WITNESSES:
INVENTOR
Edward Weston
BY Park Benjamin
his ATTORNEY.

UNITED STATES PATENT OFFICE.

EDWARD WESTON, OF NEWARK, NEW JERSEY.

STANDARD GALVANIC CELL.

SPECIFICATION forming part of Letters Patent No. 439,737, dated November 4, 1890.

Application filed May 12, 1890. Serial No. 351,525. (No model.)

*To all whom it may concern:*

Be it known that I, EDWARD WESTON, of Newark, Essex county, New Jersey, have invented a new and useful Improvement in Standard Galvanic Cells, of which the following is a specification.

My invention relates to a battery of standard galvanic cells intended to yield a current of constant pressure under a given temperature, and hence for use in making electrical measurements and comparisons.

My invention consists in the construction and arrangement of said cells in a battery of compact and convenient form in the means of maintaining said cells at a given temperature and indicating that fact, and in the disposition of the individual cells so that they may be hermetically sealed, and while readily detachable from the rest of the group may be securely held in place.

Figure 1:
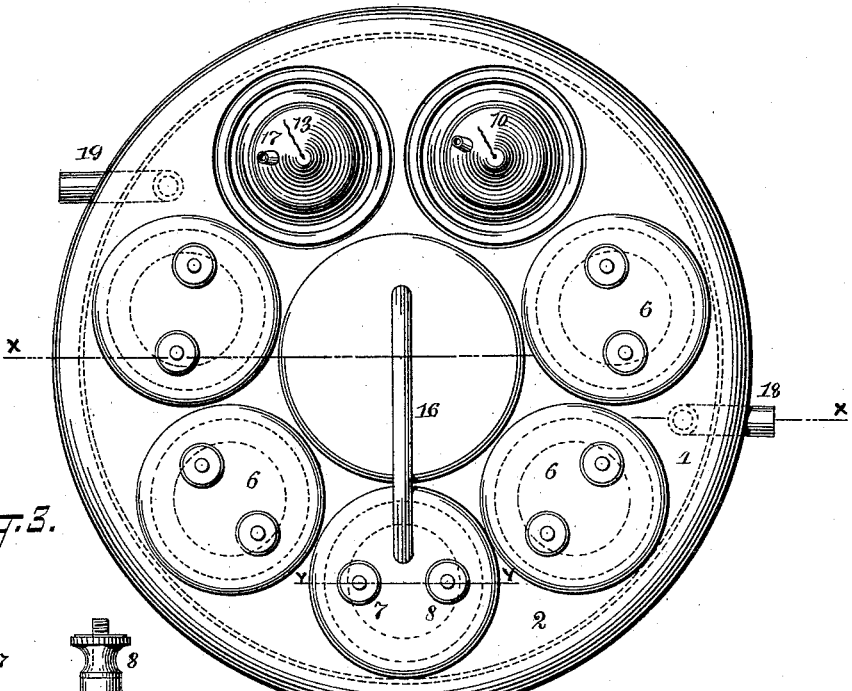
Figure 3:
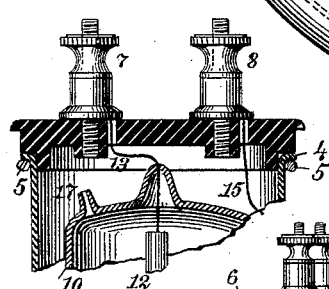
Figure 2:
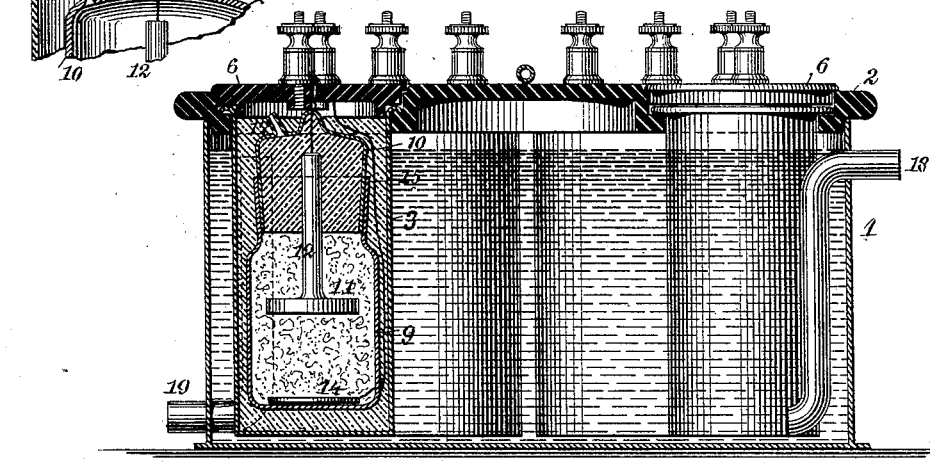

In the accompanying drawings, Figure 1 is a top view of a battery of my standard cells, the covers of two of said cells being removed. Fig. 2 is a vertical section on the line X X of Fig. 1. Fig. 3 is an enlarged detail section on the top and cover of one of my cells on the line Y Y of Fig. 1. Fig. 4 is a vertical section of one of the cells on the line Y Y of Fig. 1, showing the thermometer disposed in the central portion of the cell and coming out through the bell-shaped cover of the jar. Fig. 5. is a horizontal section on the line Z Z of Fig. 4. Fig. 6 is a similar section showing the thermometer arranged in the enlarged lower portion of the cell and not protruding through the bell-shaped cover. Fig. 7 is a top view of one of the cells with the thermometer arranged as shown in Fig. 6. Fig. 8 is a plan view of the corrugated and perforated electrode used in the cell, and Fig. 9 is a transverse section thereof.

Similar numbers of reference indicate like parts.

1 is a cylindrical containing-vessel having a circular cover 2, containing a number of circular openings, each of which receives a smaller cylindrical case or vessel 3. The upper edge of the vessel 3 is turned over or flanged, as shown at 4, Fig. 3, and this flange rests on a shoulder or ledge formed in the circular opening of the cover 2. Under the flange 4 may be arranged a gasket or rubber ring 5, as shown in Fig. 3. The circular trough 1 and the cases 3 are all to be made of metal or any other suitable material. The cover 2 is of hard rubber or other insulating material. After the vessels 3 are set in place in the manner described they are closed by covers 6, also of insulating material. Each cover is provided with two binding-posts 7 and 8, to which the cell terminals are connected. The cases 3 serve as receptacles for the cells. Each cell has a lower bottle-shaped portion 9, made of glass. Into the open mouth of said portion 9 fits a bell-shaped cover 10, also of glass.

The zinc electrode 11 is made in the form of a disk, having a central standard 12, to which standard is secured the terminal wire 13, which extends upward through a projection in the center of the bell 10, and is sealed therein. After the electrode has thus been put in place, the interior of the bell 10 is filled with a mixture of beeswax and gutta-percha, so that the rod 12 of the electrode 11 being partly embedded in said mixture the whole electrode is rigidly held in its central position. Meanwhile in the bottom of the jar 9 is placed a disk of platinum 14, which is corrugated, as shown in Fig. 8, and contains numerous small perforations. The terminal wire 15, leading from this plate, passes through the side of jar 9, where it is sealed, and then leads upward and connects to the binding-post 8. The terminal wire 13 connects with the binding-post 7. The electrolyte employed in the cell is a solution of pure mercurous sulphate mixed with a solution of zinc sulphate to form a paste.

16 is a bent thermometer, the bulb of which enters the cell 9, as shown in Figs. 4 and 6. When the thermometer tube passes down, as shown in Fig. 4, through the bell 10, a hole is drilled therein through the sealing mixture, or a pin is put in place in the bell before the sealing mixture is inserted, which pin being removed after the sealing mixture is put in leaves a suitable opening to receive the thermometer. The upper end of the thermometer is bent over at right angles, as shown in Fig. 4, and is suitably graduated.

Instead of inserting the thermometer through the bell-cover 10, I may insert it directly into the cell 9, as shown in Fig. 6, sealing the thermometer into the side of the cell. The advantage of this latter construction is that the bell-cover 10 can be removed without disturbing the thermometer. After the cell proper has been put together in the manner described, it is inserted in the case or vessel 3, and then the whole space between cell and vessel is filled with melted paraffine, whereby the cell is rigidly held in place and prevented from moving about. The cover 6 is then put into position and the terminals 13 and 15 connected to the binding-posts.

At 17 on the bell-cover 10 is shown a small tubular projection. This, as is shown in Fig. 6, communicates with a hole which is drilled through the gutta-percha mixture. The object of this construction is to allow air to escape from the jar 9, when the cover 10 is pushed down into place. After this is done the opening in the projection 17 is closed by means of the blow-pipe. Entering the circular trough 1 is a tube 18, which terminates at the bottom of the trough. On the opposite side of said trough is another tube 19, which enters at the bottom and terminates near the top of said trough.

The battery above described is intended as a standard to be used for purposes of electrical measurement. The materials contained in the cell—namely, zinc, platinum, and a paste of mercurous and zinc sulphates—constitute what is already known as "The Clark Standard Cell," and therefore I do not herein claim the combination of such materials in a galvanic cell as of my invention. A battery of such cells, however, constructed and arranged in the manner hereinbefore described, will yield a constant electro-motive force of ten legal volts, and will maintain the same at a temperature of $67\frac{1}{2}°$ Fahrenheit; or one cell will give an electro-motive force of 1.433 volts under like conditions. In order to maintain a constant temperature, I connect the pipe 18 with a source of water-supply, so that the water fills the trough 1 and rises up around the vessels 3, and finally escapes from the top of said trough by the pipe 19.

It will be observed that the several cells, while firmly held and secured in place and prevented from all danger of breakage, may each be lifted out from the trough at will. The circular arrangement of cells in the trough allows of the convenient use of one or more of them, as may be desired, and of their connection one with the other in any desired manner. The object of the thermometer 16 is to show the temperature of the cell in which it is placed, so that the heat of the surrounding water may be increased or diminished until that of the cell itself reaches the standard temperature.

I claim—

1. The combination of an inclosing-vessel, a series of galvanic cells supported therein, and means for uniformly and simultaneously varying the temperature of said cells.

2. The combination of an inclosing-vessel, a series of galvanic cells supported therein, means for uniformly and simultaneously varying the temperature of said cells, and a temperature-indicating device showing the internal temperature of said cells.

3. The combination of a galvanic cell, a temperature-indicating device communicating with the interior thereof, and a vessel inclosing said cell and having inlet and outlet orifices for the entrance and escape of a fluid.

4. In combination with a vessel provided with inlet and outlet openings for the entrance and escape of a fluid, a cover, and a series of galvanic cells supported within said vessel from said cover.

5. In combination with a vessel provided with inlet and outlet openings for the entrance and escape of a fluid, a cover, a receptacle or case detachably supported from said cover in said vessel, and a galvanic cell in said receptacle.

6. In combination with a vessel containing the elements of a galvanic cell, an inclosing-case containing a solid substance, in which said vessel is embedded, and an outer vessel or box receiving said case and provided with inlet and outlet orifices for the entrance and escape of a fluid.

7. In combination with a closed vessel containing the elements of a galvanic cell, a thermometer supported in said vessel and having its scale outside thereof and its bulb entering the electrolyte.

8. In combination with a vessel containing the elements of a galvanic cell, a detachable cover, and a thermometer supported in said cover and having its scale outside of said vessel and its bulb entering the electrolyte.

9. In combination with a closed vessel containing the elements of a galvanic cell, a thermometer-tube passing through and hermetically sealed in a wall of said vessel and having its scale outside thereof and its bulb entering the electrolyte.

10. In a galvanic cell, a vessel containing the electrolyte and one electrode, a stopper or plug adapted to enter and hermetically seal the mouth of said vessel, an electrode supported by said stopper, and a thermometer-tube passing through and supported in said stopper and provided exteriorly with a scale and having its bulb entering the electrolyte.

11. The combination of an inclosing-vessel, a cover therefor having a shouldered aperture, a receptacle or case adapted to enter said aperture and having a flange at its upper edge to rest upon the shoulder thereof, a galvanic cell in said receptacle or case, and a cover fitting said aperture and provided with binding-posts receiving the terminals from said cell.

12. The combination of the vessel 9, containing the elements of a galvanic cell, the inclosing-case 3 and solid material therein wherein said vessel is embedded, and the box 1, having a detachable cover 2 and inlet and outlet openings for entrance and escape of a fluid, the said case having flanges 4 and the said cover having openings and shoulders therein adapted to receive said flanges, whereby said case is supported from said cover.

EDWARD WESTON.

Witnesses:
R. C. FESSENDEO,
M. BOSCH.